(No Model.)
M. F. GALE.
HYDROCARBON BURNER.
No. 540,811. Patented June 11, 1895.
Fig: 1.
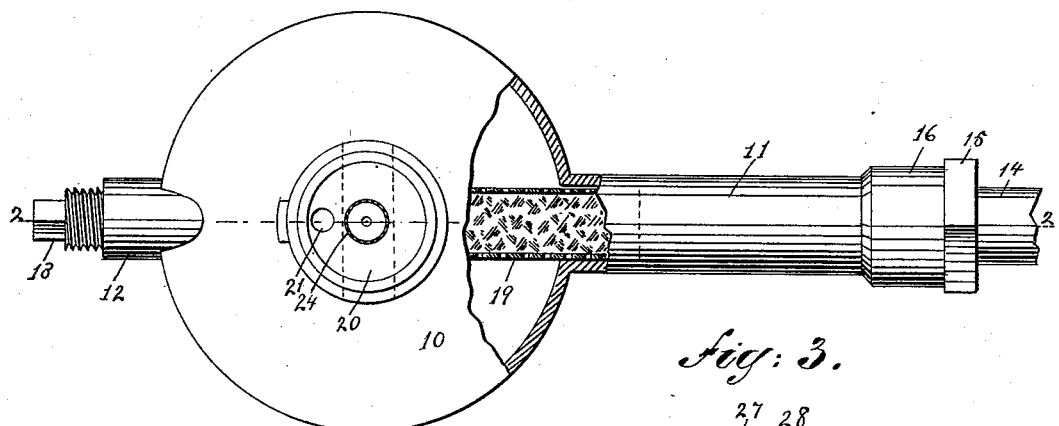
Fig: 3.
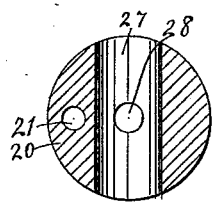
Fig: 2.
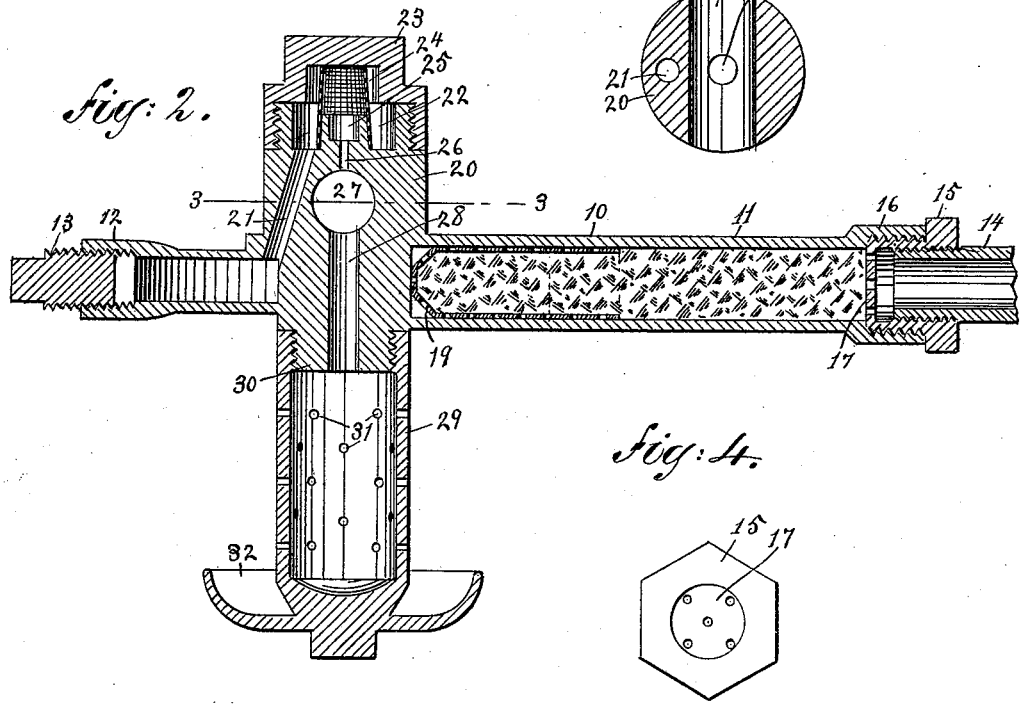
Fig: 4.
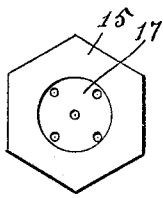
WITNESSES:
M. A. Filkins
Lydia C. Reinhart
INVENTOR
Moses F. Gale
BY
W. P. Hutchinson
ATTORNEY.

UNITED STATES PATENT OFFICE.

MOSES F. GALE, OF BROOKLYN, NEW YORK.

HYDROCARBON-BURNER.

SPECIFICATION forming part of Letters Patent No. 540,811, dated June 11, 1895.

Application filed February 16, 1895. Serial No. 538,732. (No model.)

*To all whom it may concern:*

Be it known that I, MOSES F. GALE, of Brooklyn, in the county of Kings and State of New York, have invented certain new and useful Improvements in Hydrocarbon-Burners, of which the following is a full, clear, and exact description.

My invention relates to improvements in that class of devices which are used to burn the combined vapor of oil and air, and the object of my invention is to produce a device of this character which is very cheap and simple, which may be very conveniently arranged on an ordinary chandelier or in a similar way within a room, which may be used in connection with various kinds of oil, which has means for thoroughly subdividing the oil and mingling the oil vapor with air to produce a highly combustible gaseous mixture, and which is adapted to furnish a cheap and brilliant light.

To these ends my invention consists of certain features of construction and combination of parts, which will be hereinafter fully set forth and claimed.

Reference is to be had to the accompanying drawings, forming a part of this specification, in which similar figures of reference indicate corresponding parts in all the views.

Figure 1 is a broken plan view of the burner embodying my invention. Fig. 2 is a vertical cross-section on the line 2 2 of Fig. 1. Fig. 3 is an inverted sectional plan on the line 3 3 of Fig. 2. Fig. 4 is a detailed end view of the coupling-nut used in connection with the device.

The burner is provided with a hollow body 10 which is preferably in the shape of a short cylinder, although it may be in any preferred design, and this body has on one side an inlet pipe 11, which can be cast integral with the body, while on the opposite side of the body is a nipple 12 which is made in order that the body of the burner may be more easily cast, and this nipple is usually closed by a plug 13, but it can be used, if desired, to make any pipe connection which may be necessary.

The pipe 11 is adapted to receive the oil supply which is delivered into the pipe 11 through a supply pipe 14, the connection between the two pipes being effected by a coupling nut 15 which screws to the pipe 14, and screws into the enlarged end 16 of the pipe 11, this nut 15 having an inner perforated plate 17 at its end, through which plate the oil passes and the plate is integral with the nut.

The pipe 11 is packed with cork 18, or with a packing of iron filings, or other suitable matter which has a tendency to disintegrate and subdivide the volume of oil which enters the burner, and this packing is held in a screen 19 which is of a generally cylindrical shape and which projects from pipe 11 into body 10 of the burner, as shown clearly in Fig. 1.

The burner is provided with a substantially solid core 20 which extends through the burner body at a point near the center and projects above and below the body, this core having a bore 21 therein which extends upward from the interior of the body 10, as shown clearly in Fig. 2 and which leads into the mixing chamber 22 which is formed in the top of the core 20 and in the cap 23 which is screwed to the top of the core. From the mixing chamber 22, the oil passes through a screen 24 into supplemental chamber 25, and from thence downward through a small bore 26, through a transverse bore 27, thence down through the central bore 28 of the core 20 into the burner proper 29, which is screwed to the reduced end 30 at the bottom of the core 20, and which is preferably of a general cylindrical shape, the burner proper being provided with numerous transverse perforations 31 through which the oil escapes until the burner is heated, and through which the carbureted air, or hydro-carbon gas passes after the burner is heated. The burner proper 29 is encircled at its lower end by a cup 32 into which the oil flows before the burner is hot and in which the oil is ignited, as will be presently described.

The operation of the burner is as follows: The oil is turned on through the pipe 14 which can, of course, be regulated by any usual cock, and from the pipe the oil passes through the packing 18 where it is filtered and subdivided and, entering the body 10, it finds the bore 21, passes out through the bore to the chamber 22, thence through the screen 24, thence downward through the bores 25 and 28 into the burner proper 29, and thence into the cup 32 where it is ignited. As soon as the oil is ignited it begins to heat the burner and the flame from the burner proper acts directly on the shallow body 10 so that as the oil enters it it is quickly vaporized and passes downward across bore 27, where it is mingled with a supply of atmospheric air, and the mingled air and vapor enter the burner proper 29, and as the air is thoroughly carbureted the gaseous vapor formed as above burns with a clear brilliant light at the perforations 31.

Having thus described my invention, I claim as new and desire to secure by Letters Patent—

1. A hydro-carbon burner, comprising a hollow body having a suitable oil inlet, a central core projecting through the body, the core having concentric chambers at one end and being provided with a bore leading from the body to the outer chamber, a bore leading from the inner chamber longitudinally through the core, and a bore intersecting said longitudinal bore, a screen between the outer and inner chambers of the core, and a perforated burner on the unchambered end of the core, substantially as described.

2. A hydro-carbon burner, comprising a hollow body having suitable oil supply, a longitudinally bored core extending through the body, the core being provided with concentric chambers at one end, with a bore leading from the outer chamber to the hollow body, and with an air bore intersecting the longitudinal bore, a screen arranged between the chambers of the core, a movable cap covering the chambers, and a detachable perforated burner on the unchambered end of the core, substantially as described.

3. The combination with the hollow body having a suitable oil supply, and a longitudinally bored core extending vertically through the body, the said core having an air bore intersecting the longitudinal bore, a chambered end, and a bore leading from the chambered end to the body of the perforated burner screwed to the lower end of the core and provided with a cup which is arranged beneath the perforations of the burner, substantially as described.

MOSES F. GALE.

Witnesses:
WARREN B. HUTCHINSON,
N. M. FLANNERY.